United States Patent
Alfieri

(10) Patent No.: US 7,360,213 B1
(45) Date of Patent: Apr. 15, 2008

(54) METHOD FOR PROMOTION AND DEMOTION BETWEEN SYSTEM CALLS AND FAST KERNEL CALLS

(75) Inventor: Robert A. Alfieri, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/671,041

(22) Filed: Jun. 27, 1996

Related U.S. Application Data

(63) Continuation of application No. 08/187,662, filed on Jan. 26, 1994, now abandoned.

(51) Int. Cl.
*G06F 9/44* (2006.01)
*G06F 13/24* (2006.01)
(52) U.S. Cl. .................. 718/100; 718/108; 710/260
(58) Field of Classification Search ........ 718/100–108, 718/1; 710/260
See application file for complete search history.

(56) References Cited

U.S. PATENT DOCUMENTS 5,515,538 A * 5/1996 Kleiman .................. 710/260

* cited by examiner

*Primary Examiner*—Lewis A. Bullock, Jr.
(74) *Attorney, Agent, or Firm*—Muirhead and Saturnelli, LLC

(57) ABSTRACT

Described is an enhanced application of a fast kernel trap, or kernel function call, in combination with a kernel system call providing a system of handling complications during kernel thread operations. In the event of a complication during kernel function call processing, the kernel function call promotes to a system call. If the kernel function call holds a spin lock at the time of promotion, the spin lock is released. Kernel function call processing is divided into phases and a phase identifier is provided to the system call. To avoid repeating processing steps already performed by the kernel function call, system call processing begins at the phase where the complication occurred. When the system call processing reaches a suspend phase, the system call will demote to a kernel function call and release its kernel stack.

20 Claims, 4 Drawing Sheets

METHOD FOR PROMOTION AND DEMOTION BETWEEN SYSTEM CALLS AND FAST KERNEL CALLS

This application is a continuation of application Ser. No. 08/187,662, filed Jan. 26, 1994, now abandoned.

BACKGROUND OF THE INVENTION

1. Field of the Invention

The present invention relates generally to computer operating systems and more particularly to a method for promoting and demoting between system calls and fast kernel entries.

2. Description of the Prior Art

Threads are programming constructs that facilitate efficient control of numerous asynchronous tasks. Since they closely map to the underlying hardware, threads provide a popular programming model for applications running on symmetric multiprocessing systems. As standard thread interfaces, such as the POSIX P1003.4a portable operating systems programming standard propagated by the Technical Committee on Operating Systems of the IEEE computer Society, become more common, an increasing number of portable applications employing threads are being written and more operating system vendors are providing thread support.

Threads can provide significant performance gains over sequential process execution. Applications that can take particular advantage of threads include, for example, database servers, real-time applications and parallelizing compilers.

Because kernel system calls are relatively slow compared to local thread operations, various techniques have been tried to minimize the use of system calls to increase system performance. Some prior art thread implementations for UNIX-based systems are designed to minimize the number of calls into the UNIX kernel by developing local thread libraries in user memory space. Local threads are typically multiplexed onto a smaller number of kernel-level entities. In a simple implementation, all user-level threads are multiplexed onto a single kernel-level thread. In more sophisticated implementations, the number of kernel-level entities varies with the number of CPUs that are assigned to the particular process. Thread libraries typically require a complex algorithm to bridge the gap between the user address space thread library and the kernel information. Since data integrity constraints typically require that applications be split into multiple processes and shared system services often reside in the kernel, multithreaded applications cannot avoid making substantial use of global, inter-address space thread operations in addition to local thread operations. Those thread operations that cannot be performed in local user address space must typically use relatively slow kernel system calls.

Other prior art systems have used primitives based in the kernel space. These kernel-based implementations take advantage of fast kernel trap instructions available in commercially available reduced instruction set computers to rapidly access kernel primitives to implement fast interprocess communication and other operations. The overhead associated with a fast kernel trap instruction is typically an order of magnitude less than the overhead associated with a system call and kernel-based threads provide a number of advantages such as good scalability, high reliability, optimal assignment of physical processors, minimal dispatch latency and more efficient inter-process synchronization.

Problems with many prior art systems employing fast kernel traps arise in the event that a complication, such as a software interrupt or a data access exception, occurs while the fast trap into the kernel is in progress. A data access exception could be caused by a bad memory address provided to the trap instruction by the user or a page fault, such as a read fault caused by the particular memory page being addressed not being resident in the main system memory, or a write fault caused, for example, by trying to store a value in a write protected memory location.

A fast kernel trap, by its nature, does not have the same ability to handle exception that is incorporated into the larger, slower kernel system call and many prior art systems have used awkward or undesirable techniques to handle the situation. For example, least one prior art system has utilized a nested exception handler to return a status code to the user indicating that a complication has occurred. In the event of a read fault, for example, the user application is forced to briefly "touch" the memory to cause the appropriate memory page to be retrieved from mass storage and placed in shared memory. This sort of solution is inconvenient to use. A method for handling complications in the kernel space without user intervention would be useful.

SUMMARY OF THE INVENTION

The present invention relates to a method of operation of a data processing system using an enhanced application of a fast kernel trap in combination with a kernel system call to provide an improved system of handling complications during kernel thread operations. The enhanced fast kernel trap application is referred to herein as a "kernel function call" (KFC).

It is a feature of the invention that complications are handled by promoting the KPC to a system call.

It is another feature of the invention that, if the KFC has a critical resource at the time of a complication, the KFC will release the critical resource before promoting to a system call.

It is a further feature of the invention that the system call will demote back to s KFC when a sleep phase or other relatively lengthy quiescent period is encountered.

It is an advantage of the invention that the availability of system resources, such as spin locks and kernel stacks, is increased and system latency is reduced.

Other features and advantages of the present invention will be understood by those of ordinary skill in the art after referring to the detailed description of the preferred embodiment and drawings.

DESCRIPTION OF THE PREFERRED EMBODIMENT

Figure 1:
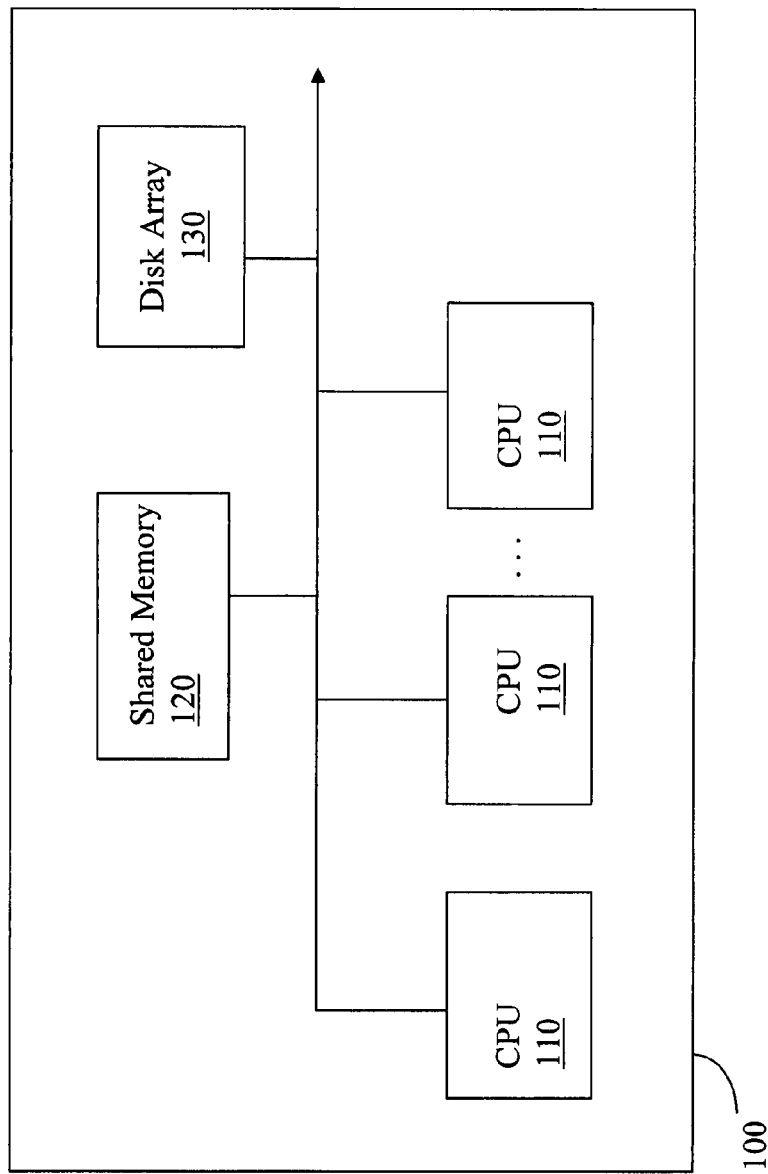
FIG. 1 is a overview of a multiprocessor data processing system.

Referring to FIG. 1, a high level overview of a multiprocessing data processing system 100 is depicted. A plurality of CPUs 110 are connected via bus 101 to shared memory 120 and to a mass storage device represented by disk array 130. All CPUs 110 share access to shared memory 120. A variety of additional well-known data processing devices and peripherals, not shown, could also be connected to bus 101.

Figure 2:
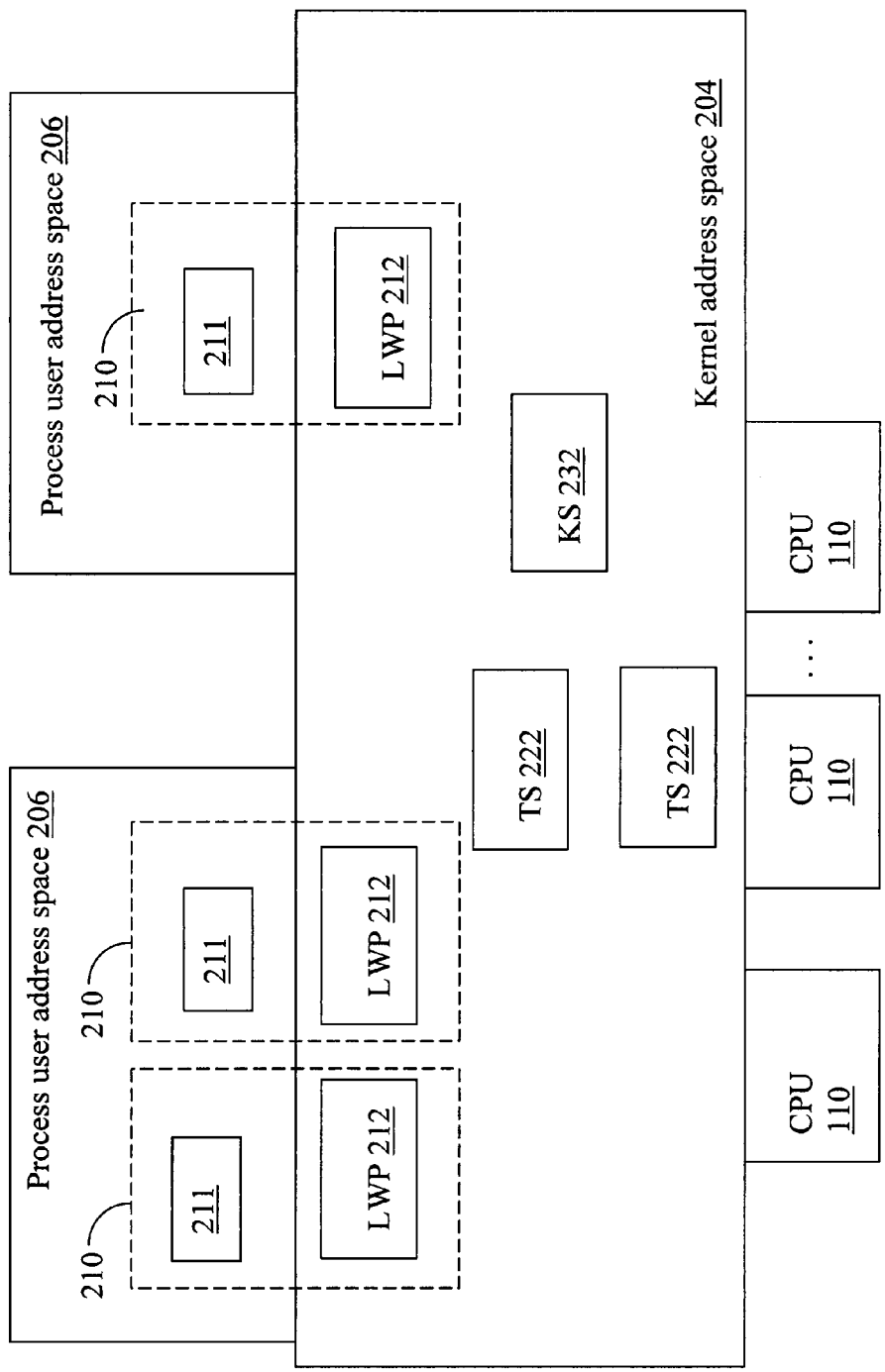
FIG. 2 shows the memory organization of multiprocessor system 100.

Referring to FIG. 2, when data processing system 100 is running, one or more user processes 206 will be resident in user address space. Each process 206 may utilize one or more threads 210 and multiple threads 210 may be active simultaneously in each process during process execution.

Each thread 210 that is active in process 206 will exist partially in process 206 address space and partially in kernel address space 204. Thread 210 contains user space portion 211 and kernel space portion 212. The kernel-resident portion of each thread is typically referred to in the art as a "light weight process" or LWP. All threads within a process have the same basic structure and will share file descriptors, address apace and other passive resources, such as security attributes and system resources for scheduling and management. All threads will be the same size, except for transient data that may be temporarily associated with the thread. In a preferred embodiment, each LWP 126 is allocated 128 bytes of nonpageable memory in kernel address space 204. Each LWP 212 will be assigned to one of the CPUs 110 for execution. Communication by thread 210 into kernel address space 204 is by means of a fast kernel trap to LWP 212.

Each thread 210 has associated with it a portion of kernel memory identified as Thread State (TS) 222. TS 222 is used to store the register state of thread 210 at the time of entering the kernel. The size required for TS 222 will vary by the underlying processor architecture. In a preferred embodiment based on the Motorola 88110 processor, TS 222 is 600-700 bytes. Since kernel address space may contain a large number of LWP 212s, it would require a substantial amount of memory to maintain all TS 222s in nonpageable memory. TS 222s are therefore located in pageable memory and a particular TS 222 may not be resident in kernel space 204 when its associated thread 210 desires to store its state.

Finally, Kernel Stack (KS) 232 represents 8K bytes of kernel address space memory required by a kernel system call during its execution. Since a single KS 232 can be used by various threads at different times, it is referred to as transient data. KFC operations do not require a KS 232.

Entry into the kernel can be implemented in various ways. Typically, a thread in user space will call a library routine which will decide that entry into the kernel is necessary. The library routine will package the appropriate arguments and trap into the kernel using the fast kernel trap instruction. The manner in which the arguments are passed to the kernel is architecture-dependent. For example, in a typical RISC processor based design, such as the AViiON family of computers from Data General Corporation, the arguments are passed into the kernel via registers. Similarly, some systems may use a single trap vector with a register holding the KFC identifier or may use a different trap vector for each KFC.

Figure 3A:
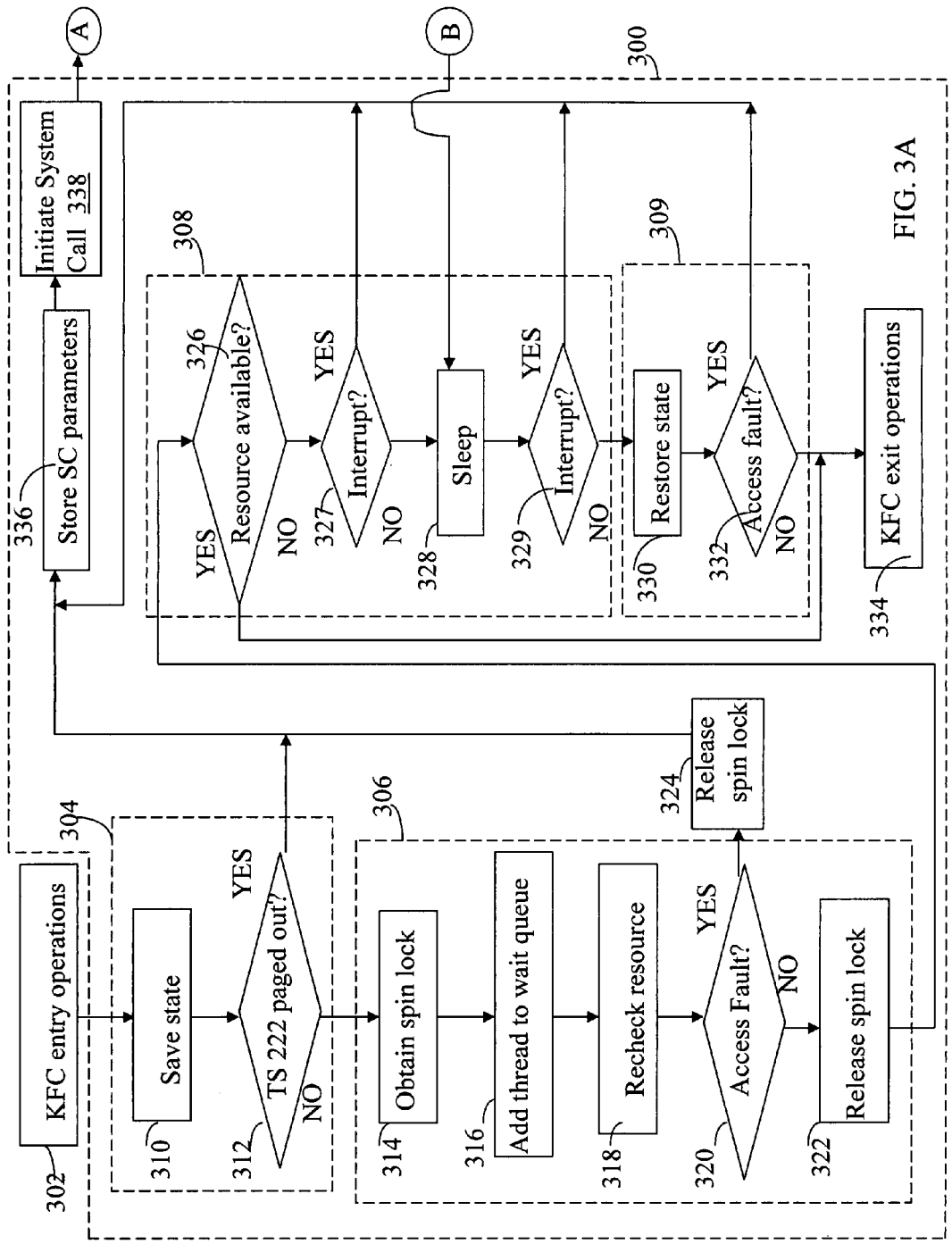
FIGS. 3A and 3B are a flow chart of the operation of KFC 300 and SC 350.
Figure 3B:
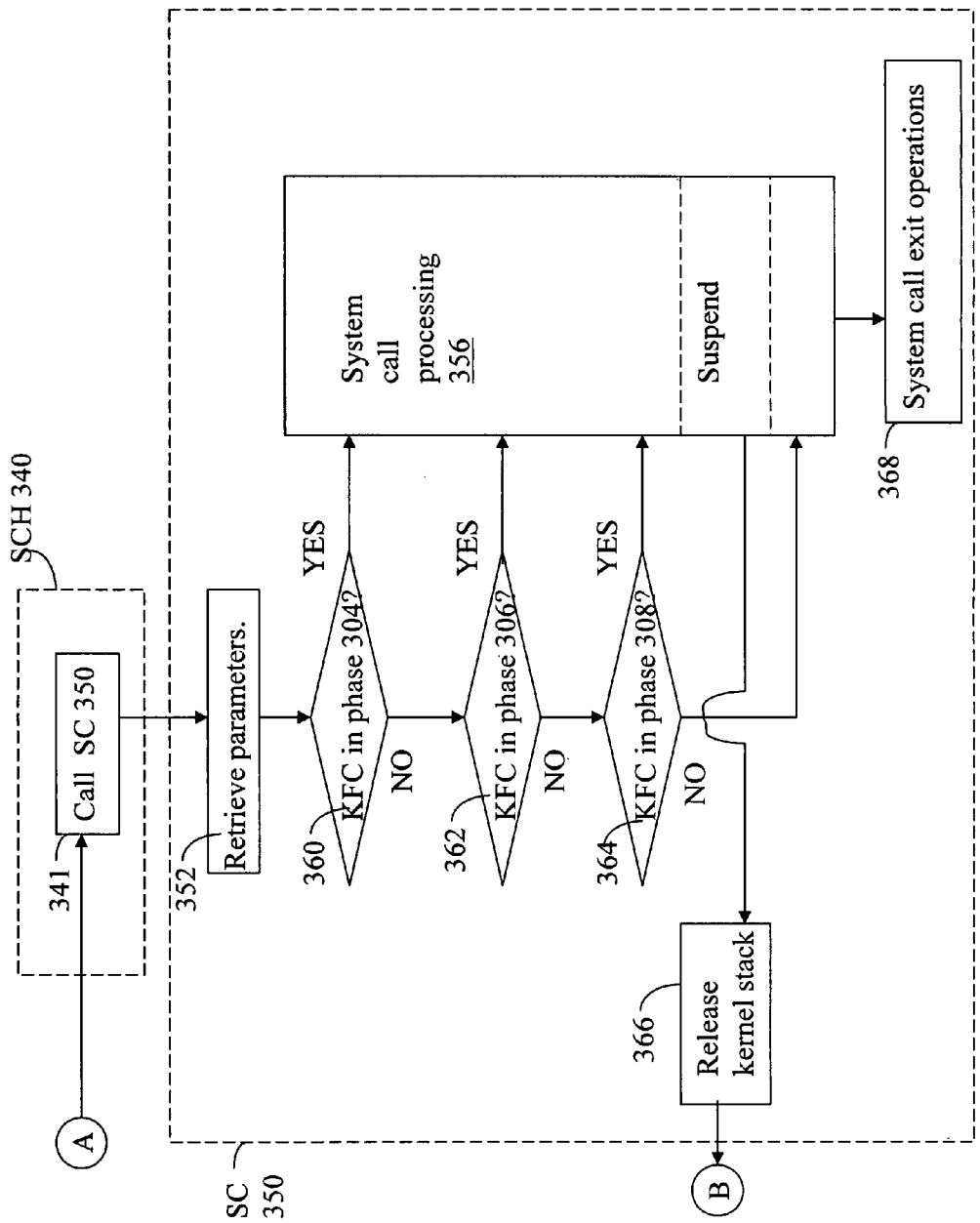

FIGS. 3A and 3B show the flow of a kernel function call and kernel system call incorporating the invention. One common KFC application of particular usefulness in illustrating the invention involves the situation where a thread in user space has attempted to access a shared resource, such as a location in system memory shared with another thread, which is currently locked by another thread and, therefore, unavailable. If the thread must wait for the resource, the thread will typically call into the kernel to execute a KFC to suspend the thread until the resource becomes available.

There is always the potential that a complication may occur while a KFC is in progress. For example, TS 222 associated with thread 210 may not be present in shared memory 120, requiring that it be paged in from disk array 130. Alternatively, there could be a software interrupt or a problem with the resource lock address provided to KFC 300. As will be discussed in connection with FIGS. 3A and 3B, complications are handled by "promoting" the KFC to a kernel system call 350. KFCs operate in a restricted kernel environment with CPU interrupts disables and full fault handling in the KFC environment is not possible.

As will be discussed in more detail below, a complication can occur at various times during execution of KFC 300. The various steps within the KFC 300 are therefore divided into phases 304, 306, 308 and 309, each phase being associated with a step or set of steps in KPC 300 at which a complication is possible. The appropriate phase identifier is included with each KFC 300 instruction and is passed to SC 350 when KFC 300 is promoted. It will be understood by those of ordinary skill in the art that KFCs can be developed to perform a variety of different operations and the specific number of phases and specific type of complications in a particular KFC will depend on the particular operations being performed.

Looking at FIGS. 3A and 38, the flow of the thread in kernel space 204 is depicted. When entering the kernel, the thread first performs FPC entry operations 302. These operations include saving the thread's user-level return address, user-level stack pointer and processor status register. When entry operations 302 are complete, the thread enters RFC 300 and an attempt is made at step 310 to save the thread's state. If TS 222 is resident in kernel address space 204, as will generally be the case under typical operating conditions, the state of thread 210 is saved in TS 222 at step 310. If TS 222 is not readily available in kernel address space 204, causing a page fault at step 312, KFC 300 prepares for promotion to system call 350 at step 336.

At step 314 the spin lock for the wait queue is obtained and thread 210 is added to the wait queue for the desired resource at step 316. The availability of the desired resource is rechecked at step 318 to determine if the resource is now available. After the availability of the resource has been checked, the spin look is released at step 322. If the resource is available at step 326, KFC 300 will move directly to KFC exit operations 334 in preparation for returning to user space.

A data access exception is possible during the operation of rechecking the resource at step 318. For example, the user page holding the resource lock may be paged out or the lock address passed into the KFC from user space may no longer be valid or may be misaligned. If any of these exceptions occurs at this point, the spin lock, which is a valuable operating system resource, is released at step 324. If the spin lock were not released, it could be held by the KFC for an indefinite period of time leading, potentially, to long latencies for other threads and perhaps deadlock.

If the resource is still not available at step 326, KFC 300 will proceed to check for the presence of a software interrupt at step 327 prior to suspending the thread at step 328. If a software interrupt event, such as a thread cancellation, abort or stop, has been received, KFC 300 moves to step 336 in preparation for promoting. If a software interrupt is not detected at step 327, KFC 300 will suspend the thread at step 328. Eventually the thread will be awakened. The thread may have been awakened naturally or may have been awakened in response to a software interrupt, therefore, step 329 checks for a software interrupt. If an interrupt was received, causing the thread to be prematurely awakened, KFC 300 again moves to step 336. If no interrupt was been received and the thread was awakened in the normal course of operation, the thread state will be restored at step 330. Restoring the thread state again involves addressing TS 222 and again there is the possibility for an access fault. If a fault occurs, KFC will move to step 336 in preparation for promotion to system call 350. If an access fault does not occur during step 330, KFC exit operations 334 are entered to handle the normal return to user space.

When a complication occurs at step 312, 320, 327, 329 or 332, the KFC will promote to system call 350 to handle the exception. At step 336, the parameters to be passed to system call 350 are stored for use by system call 350 in the same fashion that they would be stored in the event of a regular system call. These SC parameters typically include the parameters that were originally passed from user space to the KFC plus the KFC phase identifier and the kernel-level address of system call 350 associated with KFC 300. At step 338 a call to System Call Handler (SCH) 340 is initiated.

SCH 340 receives the address stored at step 336 and calls the specified system call, in this case SC 350, at step 341. Once called by SCH 340, SC 350 retrieves the parameters stored at step 338. Since there is no need for SC 350 to perform operations that have already been successfully completed by KFC 300, SC 350 performs checks at steps 360, 362 and 364 to determine which of the four KFC 300 phases was in progress when the complication occurred. System Call processing (SCP) 356 is capable of performing all operations performed by KSC 300. SC 350 will, based on the phase identifier, bypass redundant steps and will begin processing at the appropriate location within SCP 356. For example, if the access fault in KFC 300 occurred at step 330, when KFC 300 is promoted to SC 350, SCP 356 processing will begin with the step of restoring the thread state.

As mentioned above, the system call requires that it be assigned a KS 232 in kernel address space 204 to support its operation. To avoid having an excessive amount of kernel memory tied up by system calls that are not actively performing any processing, when SCP 356 processing has reached the point where SCP 356 is ready to suspend the thread at step 358 within the system cell processing 356, SC 350 will release KS 232 at step 366 and demote back to KFC 300. This allows KS 232 to be made available for use by another system call.

Demotion to a KFC is only performed if the promotion to SC 350 occurred as a result of a complication at step 312, 320, 327 or 329. If a data exception occurred at step 332, SC 350 processing is so near to completion there is no reason to demote back to KFC 300. SC 350 proceeds to handle the fault, complete the state restoration operation and move to system call exit operations 368. System call exit operations 368 and KFC exit operations 334 return identically back to user space, making the method of kernel processing transparent to the calling library routine.

The invention may be implemented in other specific forms without departing from the spirit or essential characteristics thereof. The scope of the invention is indicated by the appended claims rather than by the foregoing description and all changes within the meaning and range of equivalency of the claims are intended to embraced therein.

I claim:

1. In an operating system capable of executing processing threads and capable of supporting simultaneous operation of a plurality of kernel function calls and a plurality of system calls, a computer implemented method of operating system operation during execution of a processing thread comprising:

initiating a kernel function call which is a fast kernel trap instruction that does not use a kernel stack, monitoring for a complication during execution of the kernel function call, if a complication is detected, performing:

promoting from the kernel function call to a system call which uses the kernel stack, and continuing execution in the system call, and if a complication is not detected, completing execution of the kernel function call.

2. The method of claim 1 wherein if a complication is detected, the method further comprises:

monitoring for a suspend state in system call processing;

if a suspend state is detected, demoting from the system call to a kernel function call and continuing execution in the kernel function call; and if a suspend state is not detected, completing execution of the system call.

3. The method of claim 2, wherein said demoting from the system call to the kernel function call includes releasing, for use by another system call, kernel address space from the kernel stack used by the system call.

4. The method of claim 1 wherein said promoting from the kernel function call to a system call further includes passing to the system call an identifier indicating the amount of kernel function call execution that had been completed at the time the complication was detected.

5. The method of claim 4 wherein said continuing execution in the system call comprises:

checking the identifier passed in said promoting, and initiating system call processing within the kernel system call at the equivalent location within the system call of the same phase indicated by the identifier.

6. The method of claim 1, wherein said initiating a kernel function call includes:

saving information about a state of the thread executing in user process space in a portion of pageable memory;

determining if the portion of pageable memory is resident in kernel address space; and if the portion of pageable memory is not resident in kernel address space, detecting a complication and performing said promoting to a system call and said continuing, wherein a page fault is caused if the portion of pageable memory is not resident in kernel address space.

7. The method of claim 6, further comprising:

handling, by the system call, the page fault after performing said promoting.

8. A computer readable medium comprising code stored thereon for performing processing associated with a thread, the computer readable medium comprising code stored thereon for:

initiating a kernel function call which is a fast kernel trap instruction that does not use a kernel stack;

monitoring for a complication during execution of the kernel function call;

if a complication is detected, performing:

promoting from the kernel function call to a system call which uses the kernel stack; and continuing execution in the system call; and if a complication is not detected, completing execution of the kernel function call.

9. The computer readable medium of claim 8, wherein the computer readable medium further comprises code for, if a complication is detected:

monitoring for a suspend state in system call processing;

if a suspend state is detected, demoting from the system call to a kernel function call and continuing execution in the kernel function call; and if a suspend state is not detected, completing execution of the system call.

10. The computer readable medium of claim 9, wherein said code for demoting from the system call to the kernel function call includes code for releasing, for use by another system call, kernel address space from the kernel stack used by the system call.

11. The computer readable medium of claim 8, wherein said code for promoting from the kernel function call to a system call further includes code for passing to the system call an identifier indicating the amount of kernel function call execution that had been completed at the time the complication was detected.

12. The computer readable medium of claim 11, wherein said code for continuing execution in the system call further comprises code for:

checking the identifier passed in said promoting; and initiating system call processing within the kernel system call at the equivalent location within the system call of the same phase indicated by the identifier.

13. The computer readable medium of claim 8, wherein said code for initiating a kernel function call includes code for:

saving information about a state of the thread executing in user process space in a portion of pageable memory;

determining if the portion of pageable memory is resident in kernel address space; and if the portion of pageable memory is not resident in kernel address space, detecting a complication and performing said promoting to a system call and said continuing, wherein a page fault is caused if the portion of pageable memory is not resident in kernel address space.

14. The computer readable medium of claim 13, further comprising code for:

handling, by the system call, the page fault after performing said promoting.

15. A method for performing processing associated with a thread, the method comprising:

initiating a kernel function call which is a fast kernel trap instruction that does not use a kernel stack;

monitoring for a complication during execution of the kernel function call;

if a complication is detected, performing:

promoting from the kernel function call to a system call which uses the kernel stack; and continuing execution in the system call; and if a complication is not detected, completing execution of the kernel function call.

16. The method of claim 15, wherein, if a complication is detected:

monitoring for a suspend state in system call processing;

if a suspend state is detected, demoting from the system call to a kernel function call and continuing execution in the kernel function call; and if a suspend state is not detected, completing execution of the system call.

17. The method of claim 16, wherein said demoting from the system call to the kernel function call includes releasing, for use by another system call, kernel address space from the kernel stack used by the system call.

18. The method of claim 15, wherein said promoting from the kernel function call to a system call further includes passing to the system call an identifier indicating the amount of kernel function call execution that had been completed at the time the complication was detected.

19. The method of claim 15, wherein said initiating a kernel function call includes:

saving information about a state of the thread executing in user process space in a portion of pageable memory;

determining if the portion of pageable memory is resident in kernel address space; and if the portion of pageable memory is not resident in kernel address space, detecting a complication and performing said promoting to a system call and said continuing, wherein a page fault is caused if the portion of pageable memory is not resident in kernel address space.

20. The method of claim 19, further comprising:

handling, by the system call, the page fault after performing said promoting.

* * * * *